Oct. 14, 1958   R. D. MULLEN   2,856,036
AUTOMATIC ELECTRIC TRAILER BRAKE CONTROL SYSTEM
Filed Dec. 3, 1956   3 Sheets-Sheet 1

INVENTOR
ROBERT D. MULLEN

BY *[signature]*

ATTORNEY

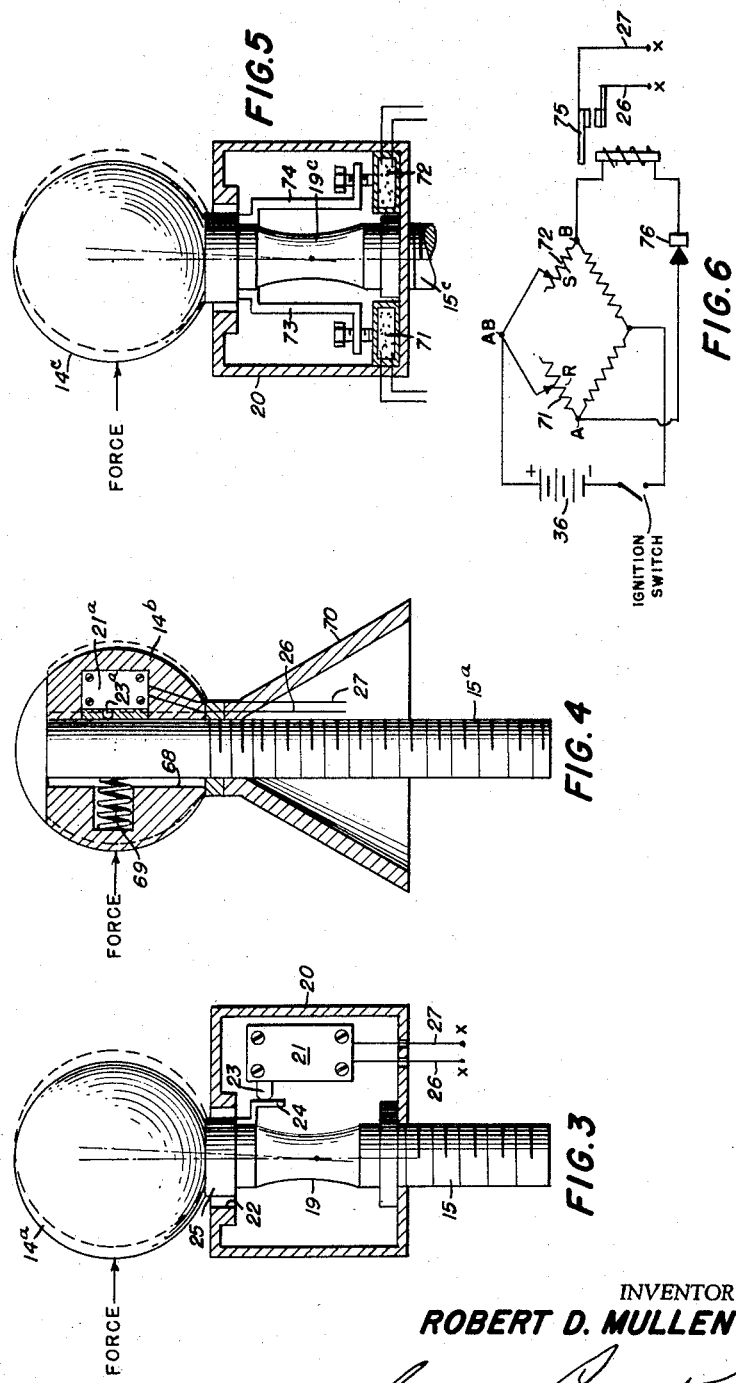

Oct. 14, 1958  R. D. MULLEN  2,856,036
AUTOMATIC ELECTRIC TRAILER BRAKE CONTROL SYSTEM
Filed Dec. 3, 1956  3 Sheets-Sheet 3

INVENTOR
ROBERT D. MULLEN
BY
ATTORNEY

United States Patent Office 2,856,036
Patented Oct. 14, 1958

2,856,036

AUTOMATIC ELECTRIC TRAILER BRAKE CONTROL SYSTEM

Robert D. Mullen, Fayetteville, N. C.

Application December 3, 1956, Serial No. 626,049

10 Claims. (Cl. 188—112)

This invention relates to a control system for electrically operated trailer brakes and consists more particularly in new and useful improvements in a control system associated with the hitch ball or trailer coupling and wherein the hitch ball acts as a sensing device for detecting relative horizontal movement between a towing vehicle and a trailer. The sensing device is electrically operated and uses the electric signal obtained by movement of the hitch ball to operate an automatic rheostat which controls the trailer brake current.

Due to the weight of most modern house trailers, it has become customary and in fact necessary that they be equipped with their own brake systems and electrically operated brakes have come into popular use because of their simplicity and dependability. Ordinarily, the brakes of these trailers are operated from the electrical system of the towing vehicle and controlled by a rheostat mounted on the steering column of the latter. When the human element is involved it is obvious that the driver of a towing vehicle cannot effect precise coordination between the brake systems of the two vehicles through two separate brake controls as they are now constructed.

Consequently, in order to avoid the jack knifing of the trailer by the premature application of the towing car brake system, it has become a common practice for the operator to purposely apply the trailer brakes to a greater extent than the car brakes, thus dragging the car. Consequently, as all of the brakes of the car-trailer combination are not doing an equal share of the work, a maximum braking effort cannot be effected.

Furthermore, an undue load is placed on the trailer brakes which materially reduce their service life. Thus, aside from the safety factor, the present control systems cause a serious maintenance problem.

It is therefore, the primary object of the present invention to provide a control system for trailer brakes which will automatically detect the need for the application of the trailer brakes and apply them to the precise extent required and at the instant they are needed, with no special attention on the part of the driver other than the normal control of the brakes of the towing vehicle.

Another object of the invention is to provide a brake control system wherein the hitch ball is designed to act as a motion sensing element which, upon detecting relative movement between the trailer and the towing vehicle, acts in a rapid succession of fore and aft movements, dependent upon the direction of the relative movement between the trailer and towing car, to either apply or release the trailer brakes in response to the progress of the towing vehicle.

A still further object of the invention is to provide in a system of this nature, a manual control for the trailer brake system which is operable independently of the automatic control.

Still another object of the invention is to provide a novel automatic rheostat which controls the trailer brake current and the extent of its application, said rheostat being so constructed that the brakes of the trailer may also be applied manually if desired, provision being made to avoid actuation of the manual control arm when the rheostat is operating automatically.

With the above and other objects in view which will appear as the description proceeds, the invention consists in the novel features herein set forth, illustrated in the accompanying drawings and more particularly pointed out in the appended claims.

Referring to the drawings in which numerals of like character designate similar parts throughout the several views, Figure 1 is a diagrammatic view in side elevation, showing the towing vehicle and connected trailer with the electrical wiring system.

Figure 3 is one form of a hitch ball-sensing device wherein the hitch ball supporting post comprises the movable element of the sensing device.

Figure 4 is another modification wherein the hitch ball per se, is movable with respect to the supporting post to comprise the sensing element.

Figure 5 is a further modification embodying a relay which makes use of the property of suitable materials to change electrical resistance as the mechanical pressure applied, changes.

Figure 6 is a diagrammatic view of the bridge circuit of the modification shown in Figure 5, and, Figure 7 is an enlarged longitudinal sectional view of the automatic rheostat for controlling the trailer brake current.

Figure 1:
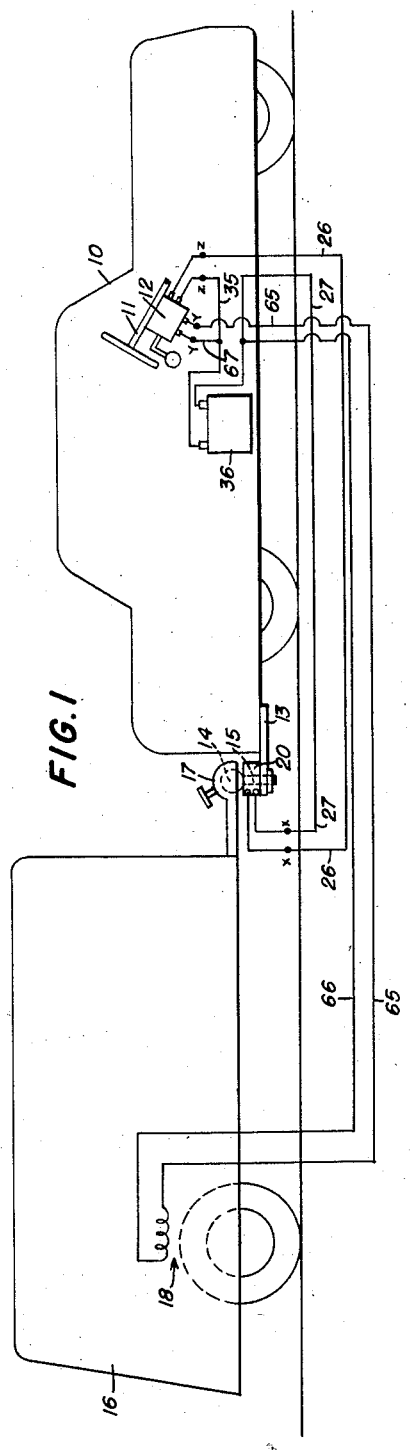
Figure 2:
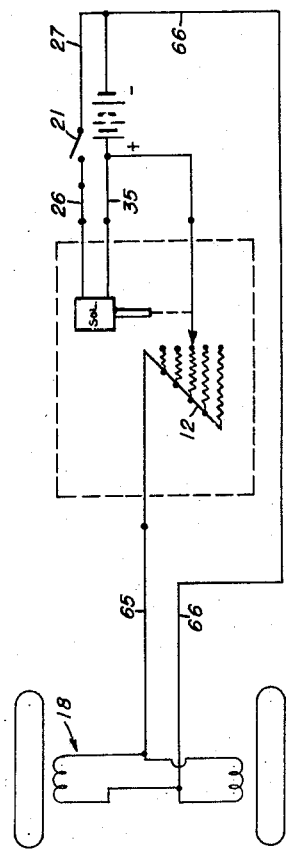
Figure 2 is a diagrammatic plan view of the wiring system.

In the drawings, referring first to Figure 1, 10 represents a conventional towing vehicle having the usual steering post 11 on which is mounted my improved automatic rheostat 12 to be described at a later point. A coupling unit 13 is attached to the rear end of the vehicle 10 in the usual manner, a hitch ball 14 being carried at the upper end of a rigidly fixed supporting post 15, forming a part of the unit 13. The trailer 16 is provided with a complementary coupling member 17 adapted to be connected to the hitch ball 14 to couple the trailer to the towing vehicle 10. The trailer may be equipped with any conventional electrically operated brakes generally represented at 18 and operated through an electrical system to be hereinafter described.

As previously indicated, one of the important features of the present invention lies in the provision of a hitch ball which is designed to act as a sensing element for relative longitudinal movement between the trailer and the towing vehicle. The particular form of hitch ball assembly may vary within the scope of the invention as illustrated in Figures 3 to 5, inclusive.

Referring first to Figure 3, one form of assembly comprises a supporting post 15 which may be fixed in any conventional manner such as screw threads, to the coupling unit 13, a hitch ball 14a being rigidly fixed to its vertical extremity. At an intermediate point in its length, the supporting post 15 is provided with a cylindrical neck 19, which is generally reduced from both longitudinal extremities toward its central section. The purpose of this reduced neck is to localize the flexing of the post within a predetermined area of its length, upon the application of force to the hitch ball 14a in either forward or aft direction, as and for the purpose hereinafter set forth. It will be understood, however, that I do not intend to limit myself to a reduced neck of this particular shape or in fact, to a reduced neck, as it may be that the supporting post may be composed of material having the necessary limited flexibility to perform the desired function.

A housing 20 supporting a suitable microswitch 21, envelops the reduced neck portion 19 immediately below the hitch ball 14a, an opening 22 being provided to accommodate the upper end of the supporting post 15 with sufficient radial clearance to permit the desired flexing action of said post. The microswitch 21 has a control button or push rod 23 which projects in the direction of the supporting post 15 and is arranged in line for abutment by a finger 24 which is fastened to the supporting post by means of a collar 25 or other suitable means, so as to be movable toward and away from the push button 23, upon the flexing movement of the post 15.

Electrical conductors 26 and 27, forming a circuit X—X lead from the microswitch 21 so that when force is applied to the hitch ball 14a in the direction of the arrow shown in Figure 3, the supporting post 15 will be flexed at its neck portion 19, causing the normally open switch 21 to be closed by the contact of the finger 24, with the push button 23, thus closing the circuit X—X and energizing the automatic rheostat 12, as will later appear.

Figure 7:
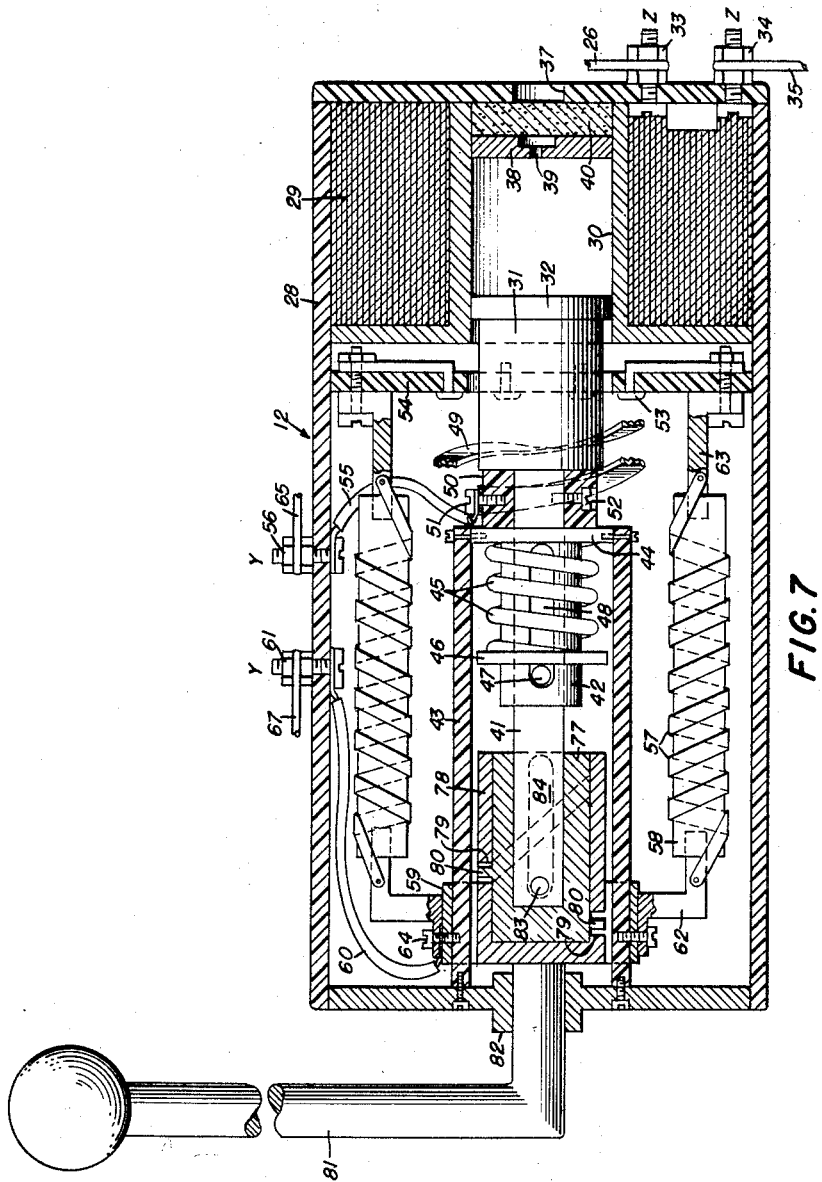

Turning now to Figure 7, the automatic rheostat 12 comprises a main housing 28, having a solenoid arrangement in one end in the form of an electromagnet 29 with an axial cylinder 30 for slidably receiving a piston 31, carrying a carbon sealing disc 32 formed with a close peripheral fit within the cylinder 30. The electromagnet 29 is provided with two binding posts 33 and 34 for connection to electrical conducting wires 26 and 35 respectively (Fig. 1). The conducting wire 35 leads to one post of the conventional car battery 36 and as previously stated, the conducting wire 26 leads from one side of the microswitch 21 in the hitch ball assembly. The opposite conducting wire 27 from the microswitch 21, leads to the opposite post of the battery 36.

Thus, the closing of the circuit X—X by the operation of the microswitch 21, energizes the electromagnet 29 which causes the piston 31 to be drawn into the cylinder 30. The end of the housing 28 is apertured as at 37, coaxially of the cylinder 30 and a disc 38 is provided in the base of the cylinder, having a restricted orifice 39 which provides a dashpot action for the solenoid, so that when the piston 31 is drawn into the cylinder by the magnet 29, the air in the cylinder is expelled slowly through the orifice 39. Preferably, a suitable filter 40 is provided between the disc 38 and the end wall of the housing 28 to prevent the orifice 39 from becoming clogged.

A piston shaft 41 is connected to the piston 31 and extends longitudinally within the housing 28. The shaft 41 is slidably supported in a shaft bearing 42 which in turn is mounted in an insulated supporting sleeve 43 fixed coaxially within the housing 28. The inner end of the sleeve 43 is closed by an annular abutment 44 and a coil spring 45 is interposed between this abutment and a collar 46 which surrounds the shaft bearing and is engaged on its outer face by a pair of pins 47 fixed to and projecting radially from the shaft 41. A longitudinal slot 48 permits the longitudinal movement of the pins 47 upon the longitudinal movement of the shaft 41 with the piston 31, whereupon the spring 45 is compressed between the collar 46 and the abutment 44. Naturally, when the battery voltage is disconnected from the terminals 33—34, the spring 45 causes the retraction of the piston 31 from the cylinder 30.

A spiral electrical contact member 49 is supported at one end by an insulating block 50 by means of a screw 51, the block 50 surrounding the piston shaft 41 and being connected thereto by a screw 52. Upon the inward movement of the piston 31, the insulating block 50 moves inwardly therewith through its connection to the piston shaft so that the spiral electrical contact 49 will progressively engage a series of stationary contacts 53 which are arranged in annularly spaced relation in an insulating plate 54, disposed within the housing 28. The spiral contact is connected to the end of one of a series of resistance elements 57 respectively wound on insulators 58. A bus ring 59 connects the opposite ends of the respective resistance elements to each other and an electrical conducting wire 60 connects them to a terminal 61. The resistance elements and insulators 57—58 extend longitudinally within the housing 28 and are arranged in annularly spaced relation around the insulating sleeve 43, being supported by suitable brackets 62 and 63 at opposite ends.

The arrangement of these resistances is such that the resistance connected to the first contact 53 engaged by the spiral contact, has the greatest electrical resistance, the resistance becoming progressively less with each succeeding contact until the last contact which has no resistance but which will be connected directly to the bus ring as at 64.

A wire 65 connects terminal 56 with the trailer brake 18, the circuit to which is completed by electrical conducting wire 66 which leads to wire 27 and thence to one of the terminals of the battery 36. The opposite terminal 61 of the rheostat is connected by wire 67 to wire 35 and thence to the opposite post of the battery 36, thus completing circuit Y—Y.

As previously stated, the automatic rheostat which controls the trailer brake current, may be so constructed that the brakes can be applied manually and this manual feature will be described later. However, at this point, in the interest of continuity, the automatic operation of the device will be described. During the course of forward travel of the towing vehicle 10 and the trailer 16, when the automobile brakes (not shown) are applied either to stop or reduce the forward speed of the automobile, the inertia of the trailer will cause it to move forward toward the automobile. This relative forward movement of only a few thousandths of an inch will cause the hitch ball 14a (Fig. 3) to move forward flexing the supporting post 15 at its neck 19, a sufficient degree to cause the finger 24 to close the microswitch 21, thus closing the circuit X—X which leads through lines 26—27 to the car battery 36 and the electromagnet 29 of the rheostat control 12. This will draw the piston 31 inwardly in the cylinder 30 with a dash pot action, which, through the spiral contact 49 and fixed contacts 53 energizes circuit Y—Y leading to the trailer brake mechanism 18 through lines 65, 66 and 67. The spiral contact 49 is moved to progressively smaller resistances which will apply the trailer brakes progressively stronger until a point is reached where the drag of the brakes on the trailer is sufficient to relieve the forward pressure on the hitch ball 14a. When this forward pressure is relieved, the hitch ball switch 21 will open the circuit X—X, cutting off the current to the electromagnet 29 which will cause the contact 49 to move to progressively greater resistances, thus reducing the current to the trailer brakes 18 until there is insufficient drag on the brakes to hold the trailer back. The trailer will then start to move forward again to repeat the cycle just described, the complete cycle requiring less than a second and being repeated over and over as long as the braking of the trailer is required, thus never permitting the trailer to actually push the towing vehicle.

In the modified form of hitch ball assembly shown in Figure 4, the supporting post 15a is rigid and the hitch ball 14b is shiftably mounted at the upper end thereof. The hitch ball is provided with a central vertical recess 68 which embraces the upper end of the post 15a with sufficient fore and aft clearance to permit a slight relative movement between the hitch ball and the post, the hitch ball being normally maintained at its extreme rearward position by a coil spring or the like 69. The microswitch 21a in this instance, is mounted within the hitch ball 14b with its push button 23a in line for engagement with the periphery of the post 15a. The microswitch 21a is of the type which is normally maintained in circuit breaking position when its push button 23a is depressed by engagement with the post 15a as shown in full lines in Figure 4, and which assumes circuit closing position when the push button is retracted upon disengagement with the post 15a, as shown in dotted lines. Thus, upon the application of force to the hitch ball 14b by the forward relative movement of the trailer, the hitch ball moves forwardly with respect to the post 15a against the tension of spring 69 to cause the closing of the circuit X—X through lines 26—27 to operate the trailer brakes in the manner previously described. A suitable support 70 may be provided for maintaining the post 15a rigid and to facilitate the support of the hitch ball 14b.

In the further modification shown in Figures 5 and 6, the hitch ball assembly eliminates the use of a switch and employs instead, a relay arrangement which takes advantage of the property of some such material as powdered carbon, to change electrical resistance as the mechanical pressure applied, changes. In this form the hitch ball 14c and its supporting post 15c are similar to those described in connection with the form shown in Figure 3. However, instead of the switch 21 arranged in the housing 20 as previously described, the housing 20 contains two buttons 71 and 72, containing powdered carbon or similar material. These buttons are represented as variable resistors in the bridge circuit shown in Figure 6. The upper portion of the supporting post 15c supports an opposed pair of abutments 73 and 74, depending within the housing 20 for selective contact with the respective buttons 71 and 72. The buttons or resistances 71—72 are connected to the circuit which leads to the trailer brake assembly so that when forward pressure is applied to the hitch ball 14c the supporting post 15c will flex at 19c, causing the pressure to increase on the button 72 and decrease on the button 71. This will unbalance the bridge circuit (Fig. 6) and cause current to flow through the sensitive relay 75 which will close the circuit at X—X, through lines 26 and 27 to operate the trailer brakes in a manner previously described. The purpose of the rectifier 76 is to allow current to flow in one direction only which will prevent back pressure on the hitch ball 14c from energizing the relay 15.

Turning again to Figure 7, which illustrates the manual control feature, it will be seen that the inner end of the piston shaft 41 terminates within the central cylindrical recess of an annular floating coupling 77. The coupling 77 is enveloped by a concentric coupling housing 78, which is provided with a spiral slot or slots 79, adapted to receive radially projecting pins 80 carried by the coupling 77. The end of the coupling housing 78 is fixed to a manually operated arm or lever 81 which is rotatably supported in a bearing 82 in the end of the housing 28. The shaft 41 is provided with a pair of radially projecting pins 83 adapted to engage corresponding slots 84 in the floating coupling 77.

Thus, upon the automatic operation of the system by the electromagnet 29 and piston 31, the piston shaft 41 is permitted to move longitudinally with the pins 83 sliding freely within the slots 84 so that the manual control is unaffected. However, when it is desired to operate the system manually, the rotation of the control arm 81 causes the rotation of the coupling housing 78 which, through the engagement of the pins 80 and the spiral slots 79 causes the longitudinal shifting of the piston shaft 41, by movement of the coupling 77, to actuate the spiral electrical contact device 49—53.

From the foregoing it is believed that the invention may be readily understood by those skilled in the art, without further description, it being borne in mind that numerous changes may be made in the details disclosed, without departing from the spirit of the invention as set forth in the following claims.

I claim:

1. A combined hitch and electric trailer brake control unit for a tow vehicle and trailer combination, including an electric trailer brake control circuit, said unit comprising a hitch ball suporting post adapted to be rigidly fixed at one end on the rear end of said vehicle, a motion sensing hitch ball carried at the opposite end of said post, for engagement by the tow bar of said trailer, said post supporting said hitch ball for limited fore and aft movement in response to relative fore and aft movement of said trailer with respect to said vehicle, and electric means associated with said hitch ball, responsive to fore and aft movement thereof, for selectively controlling the operation of said circuit.

2. The combination as claimed in claim 1, wherein said supporting post is capable of limited fore and aft flexing movement in response to corresponding forces applied to said hitch ball, said electric means being responsive to said flexing movement.

3. The combination as claimed in claim 2, wherein said electric means comprises a microswitch.

4. The combination as claimed in claim 2, wherein said electric means comprises a pressure responsive, variable resistance device, controlled by variations in the flexing movement of said post, said device being arranged in a bridge circuit including a relay, responsive to the resistance device for opening and closing said brake control circuit.

5. A combined hitch and electric trailer brake control unit for a tow vehicle and trailer combination, including an electric trailer brake control circuit, said unit comprising a hitch ball supporting post adapted to be mounted on the rear end of said vehicle, a hitch ball carried at the upper end of said post for engagement by the tow bar of said trailer, said hitch ball being supported for the limted fore and aft movement relative to said post, in response to corresponding fore and aft movement of said trailer with respect to said vehicle, and a microswitch associated with said hitch ball and supporting post, responsive to relative fore and aft movement between the two, for selectively controlling the operation of said circuit.

6. The combination as claimed in claim 5, wherein said microswitch is mounted within said hitch ball, a push button for actuating said microswitch, arranged for abutment with the periphery of said supporting post, and spring means interposed between said hitch ball and supporting post in opposite relation to said push button, for normally maintaining said microswitch in circuit breaking condition.

7. An automatic control system for electrically operated trailer brakes, including a normally open electric circuit having a source of electric current, an electric trailer brake mechanism, an electrically operated energizing device for said mechanism, a combined hitch and circuit control assembly comprising a motion sensing hitch ball, a fixed post supporting said hitch ball at the rear end of a towing vehicle, for limited fore and aft movement, a complementary hitch member mounted on the forward end of a trailer, said hitch ball being responsive to fore and aft movement of said trailer with respect to said vehicle, and a circuit control element associated with said hitch ball, operable upon fore and aft movement thereof, to selectively control the operation of said brake energizing device.

8. An automatic control system for electrically operated trailer brakes, including a normally open electric circuit having a source of electric current, an electric trailer brake mechanism, an electrically operated energizing device for said mechanism, a combined hitch and circuit control assembly comprising a hitch ball, means supporting said hitch ball at the rear end of a towing vehicle, for limited fore and aft movement, a complementary hitch member mounted on the forward end of a trailer, said hitch ball being responsive to fore and aft movement of said trailer with respect to said vehicle, and a circuit control element associated with said hitch ball, operable upon fore and aft movement thereof, to selectively control the operation of said brake energizing device, said brake energizing device comprising a solenoid, responsive to said circuit control element, and a variable resistance device progressively operable by said solenoid to selectively regulate the flow of current to said brake mechanism.

9. A system as claimed in claim 8, including a dash pot for causing retarded action of said solenoid.

10. A system as claimed in claim 8, including independent manually controlled means for operating said variable resistance device.

References Cited in the file of this patent

UNITED STATES PATENTS

| | | |
|---|---|---|
| 2,135,097 | Billingsley | Nov. 1, 1938 |
| 2,210,694 | Vogel | Aug. 6, 1940 |
| 2,377,318 | Born | June 5, 1945 |

FOREIGN PATENTS

| | | |
|---|---|---|
| 439,728 | Germany | Jan. 17, 1927 |